C. DISSTON.

SAWS.

No. 7,021. Reissued March 28, 1876.

Witnesses
Harry Smith
Harry Hawson Jr

Charles Disston
by his Attorneys
Howson and Son

N. PETERS, PHOTO-LITHOGRAPHER, WASHINGTON, D. C.

UNITED STATES PATENT OFFICE.

CHARLES DISSTON, OF PHILADELPHIA, PENNSYLVANIA, ASSIGNOR TO HENRY DISSTON, HAMILTON DISSTON, AND ALBERT H. DISSTON.

IMPROVEMENT IN SAWS.

Specification forming part of Letters Patent No. 63,024, dated March 19, 1867; reissue No. 7,021, dated March 28, 1876; application filed February 17, 1876.

*To all whom it may concern:*

Be it known that I, CHARLES DISSTON, of Philadelphia, Pennsylvania, have invented an Improved Mode of Securing Detachable Teeth to the Blades of Saws; and I do hereby declare the following to be a full, clear, and exact description of the same, reference being had to the accompanying drawing, and to the letters of reference marked thereon.

My invention consists of a mode, described hereafter, of securing detachable teeth to the blades of saws, whereby the use of rivets and other appliances, which tend to wound and warp the blades, is obviated, and the removal and replacing of teeth rendered easy of acomplishment.

In order to enable others skilled in the art to make my invention, I will now proceed to describe the manner of carrying it into effect.

Figure 1:
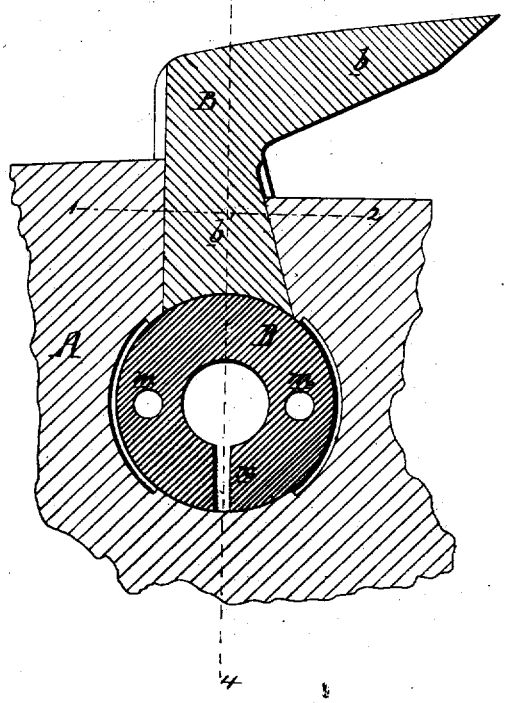
Figure 2:
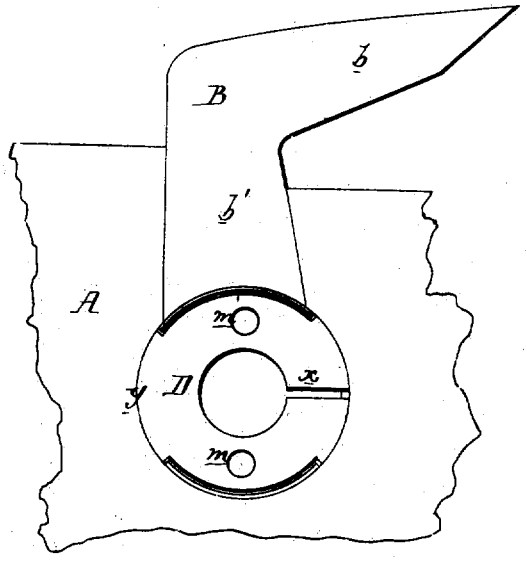
Figure 5:
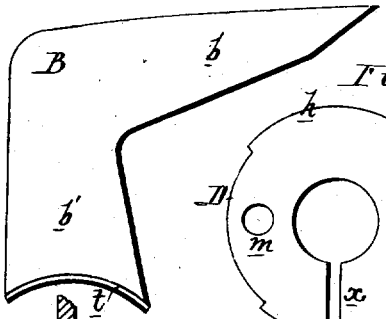
Figure 4:
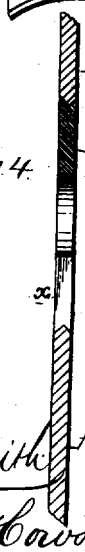
Figure 3:
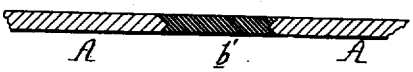

On reference to the accompanying drawing, which forms a part of this specification, Figure 1 represents a detachable saw-tooth and part of a saw-blade, and illustrates my improved mode of securing the former to the latter; Fig. 2, the same as Fig. 1, in section; Fig. 3, a section on the line 1 2, Fig. 2; Fig. 4, a section on the line 3 4, Fig. 2; and Figs. 5, 6, and 7, views of the several parts detached from each other.

Similar letters refer to similar parts throughout the several views.

A represents part of the blade of a saw; B, one of the detachable teeth, and D the retaining-ring.

Figure 6:
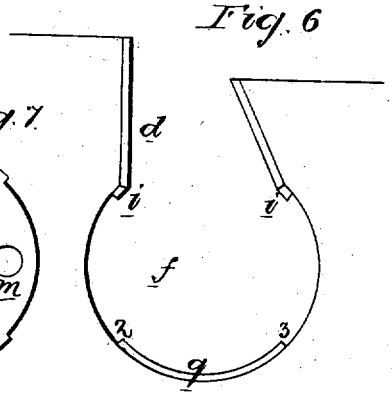

The tooth consists of the cutting projection *b* and base *b'*, which is of the tapering form represented in the drawing, and is adapted to an opening, *d*, Fig. 6, of corresponding shape in the blade, the opposite edges of the base having V-shaped grooves corresponding with V-shaped ribs on the edges of the tapering opening *d*. The base of the tooth having been snugly fitted into the said tapering opening, it is locked to its place by a split ring or segment, D, which is adapted to a circular opening, *f*, Fig. 6, in the blade.

The segment D should be made slightly larger in diameter than the said opening *f*, which may be done by hammering it at *y*, Fig. 1, so that it must be contracted before it is introduced into its place, in order that by its elasticity it may be self-binding against the edge of the opening, and so that it cannot be turned therein without considerable effort.

At the lower edge of the opening *f*, between the points 2 and 3, is a V-shaped rib, *q*, there being two similar, but smaller, ribs, *i i*, at the upper edge of the said opening, where it communicates with the tapering opening *d*, and these smaller ribs, when the tooth is in place, form continuations of a similar-shaped rib, *t*, formed on the lower edge of the base *b'* of the tooth.

Figure 7:
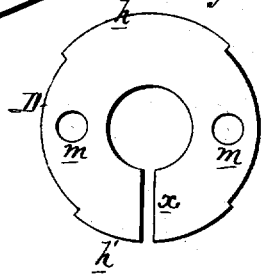

The segment D is split at *x*, and has two projections, *h h'*, Fig. 7, with V-shaped grooves adapted to the ribs on the edge of the opening *f f* in the blade, and under side of the base *b'* of the tooth.

When the segment is in position it can be pushed laterally into the opening *f*, after which the segment must be turned until the V-shaped ribs *i i*, together with the rib *t* on the under side of the base of the tooth, fit into the groove of one of the ribs *h* of the segment D, and the rib *q*, on the lower edge of the opening *f* in the blade fits into the groove of the other projection, *h'*, of the segment. Not only is the tooth thus firmly held up to its place, but the retaining-segment is locked to the blade.

Two holes, *m m*, may be bored in the segment for the reception of projections on a suitable key, by means of which the ring may be turned.

It will be seen that detachable teeth can be thus secured to the saw without the aid of rivets and other appliances, which tend to warp the blade, and that the tooth can be readily removed after first withdrawing the segment D, and then depressing the base of the tooth, so that it will be released from its bearings in the tapering opening *d* of the blade.

I claim as my invention—

The combination of a detachable tooth, adapted to the blade of a saw, with an elastic segment made separate from the tooth, adapted to the blade, and serving to lock the tooth to the same, all substantially as herein specified.

In testimony whereof I have signed my name to this specification in the presence of two subscribing witnesses.

Witnesses: CHARLES DISSTON.

A. H. SHOEMAKER,

GEO. S. GAUDY.